No. 670,747. Patented Mar. 26, 1901.
F. F. WAECHTER & F. V. HETZEL.
DISCHARGE DEVICE FOR HOPPERS.
(Application filed Feb. 23, 1900.)
(No Model.) 3 Sheets—Sheet 1.
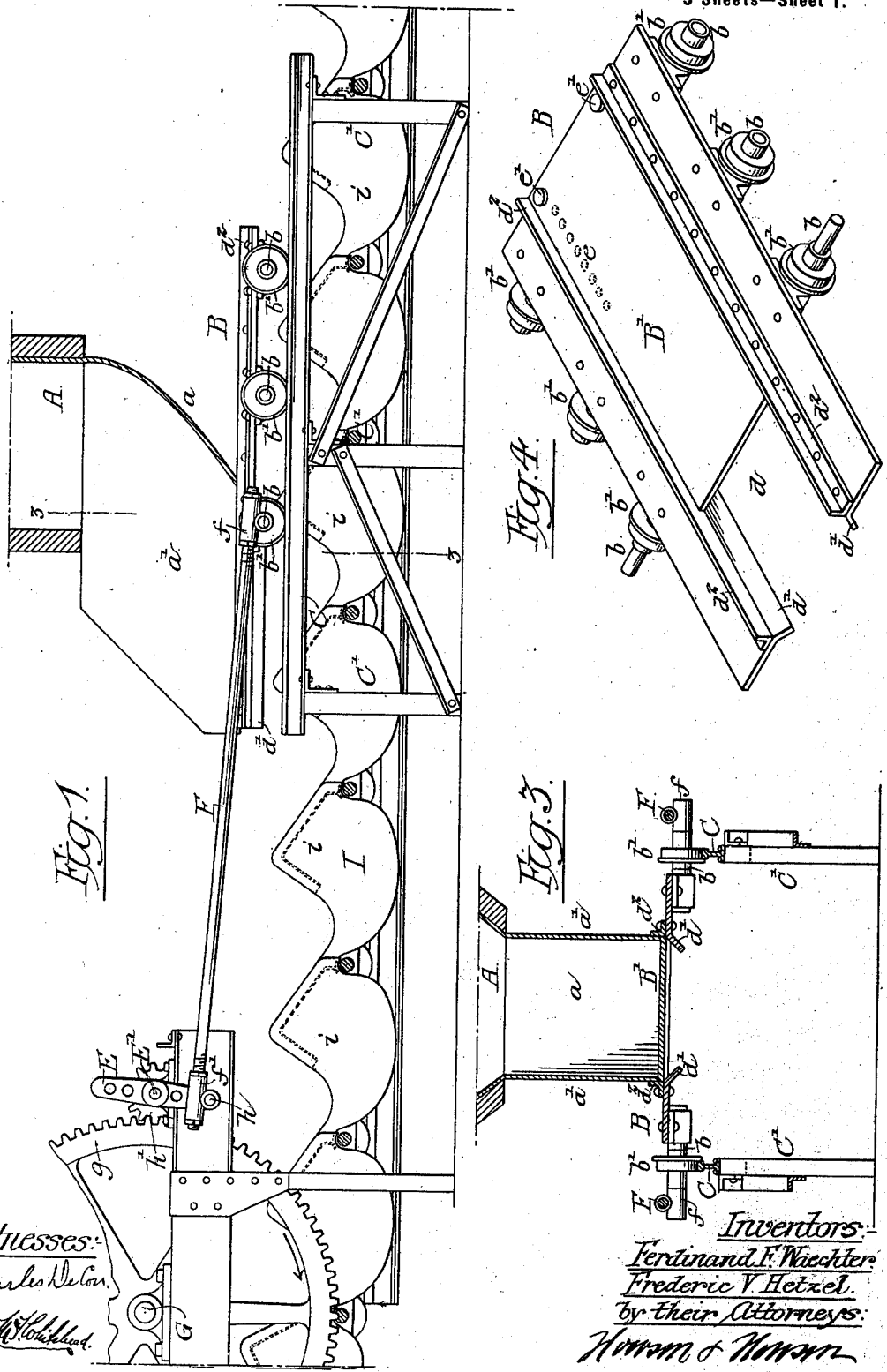
Witnesses:
Charles DeCou.
Inventors:
Ferdinand F. Waechter
Frederic V. Hetzel.
by their Attorneys:

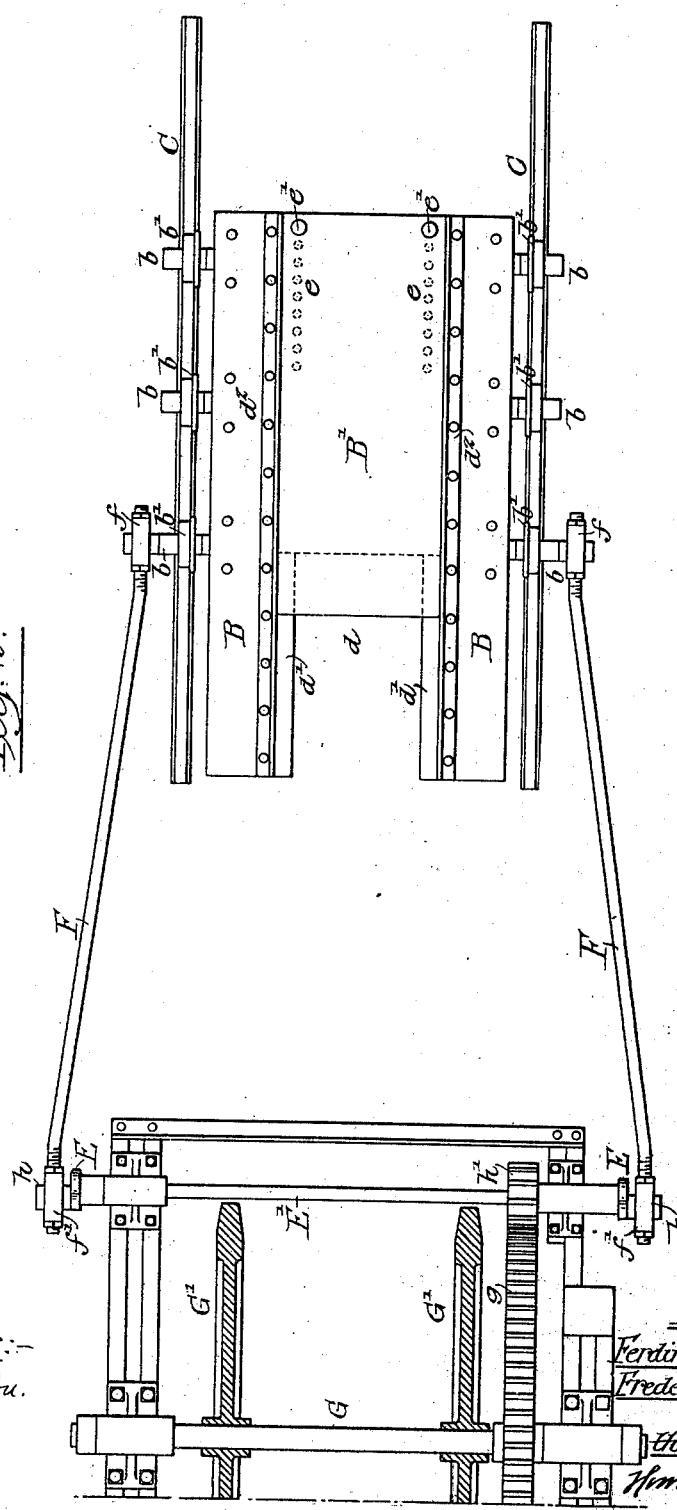

No. 670,747.   
Patented Mar. 26, 1901.
F. F. WAECHTER & F. V. HETZEL.
DISCHARGE DEVICE FOR HOPPERS.
(Application filed Feb. 23, 1900.)

(No Model.)

3 Sheets—Sheet 3.

Witnesses:—

Inventors:—
Ferdinand F. Waechter.
Frederic V. Hetzel.
by their Attorneys:—

United States Patent Office.

FERDINAND F. WAECHTER AND FREDERIC V. HETZEL, OF PHILADELPHIA, PENNSYLVANIA, ASSIGNORS TO THE LINK BELT ENGINEERING COMPANY, OF SAME PLACE.

DISCHARGE DEVICE FOR HOPPERS.

SPECIFICATION forming part of Letters Patent No. 670,747, dated March 26, 1901.

Application filed February 23, 1900. Serial No. 6,272. (No model.)

*To all whom it may concern:*

Be it known that we, FERDINAND F. WAECHTER and FREDERIC V. HETZEL, citizens of the United States, residing at Philadelphia, Pennsylvania, have invented certain Improvements in Discharge Devices for Hoppers, of which the following is a specification.

The object of our invention is to construct a discharge device for hoppers or chutes that will discharge a certain quantity of material intermittently and in which the amount of discharge can be regulated, as fully described hereinafter.

Our invention is particularly adapted for feeding material, in which the lumps are irregular in size, to conveyers; but it will be understood that the feeding mechanism may be used for any purpose and in connection with any machine requiring an intermittent feed from a hopper or bin.

Figure 5:
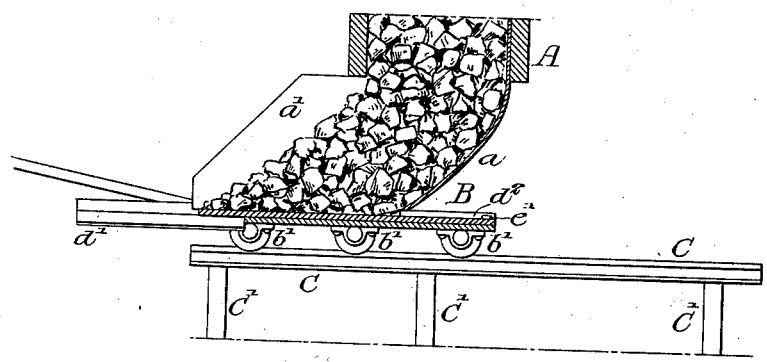
Figure 6:
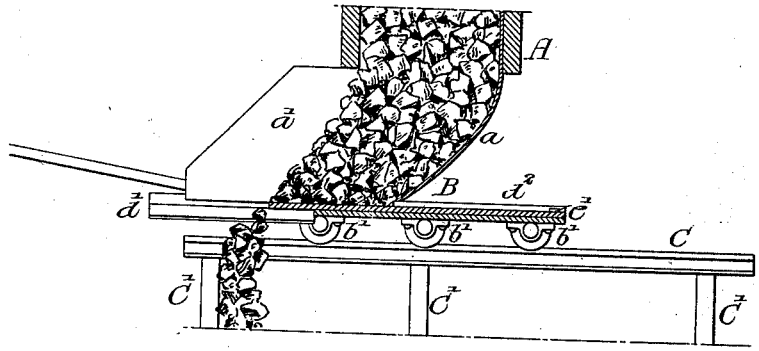

In the accompanying drawings, Figure 1 is a side view, partly in section, of our improved hopper-discharge device. Fig. 2 is a plan view with the hopper removed. Fig. 3 is a section on the line 3 3, Fig. 1. Fig. 4 is a perspective view of the carriage, and Figs. 5 and 6 are diagram sectional views showing the discharge device in its two extreme positions.

A is the hopper or receptacle, which can be of any construction.

B is the carriage, having a bottom plate $B'$. Extending from the hopper A to the carriage are side plates $a'$ $a'$ and an inclined back plate $a$, Fig. 1. The carriage B has axles $b$, on which the wheels $b'$ are mounted, and these wheels are adapted to the rails C of a supporting structure $C'$, which may be of any suitable form. The body of the carriage B is cut away at $d$, which forms a discharge-opening for the material. The plate forming the body of the carriage is bent at each side $d'$ of the opening $d$ at the forward end, so as to act as a support for the bottom plate $B'$ when extended and at the same time act as an inclined guide for the material.

Secured to the top of the carriage are angle-bars $d^2$, which not only act as guides for the bottom plate $B'$, but also add stiffness to the structure.

In the body of the carriage are a series of holes $e$, (shown by dotted lines in Fig. 2,) and in the plate $B'$ are holes, and adapted to the holes are pins $e'$, which lock the plate to the carriage. Thus by removing these pins the plate can be moved on the carriage to any point desired, according to the angle of repose of the material being discharged. It can also be set to increase or decrease the amount of feed of the material from the hopper, as it will be understood in referring to Figs. 2 and 3 that the plate $B'$ controls the discharge of material.

It will be noticed that the lower portion of the hopper is open at the front on a plane at an angle to the plane of the carriage or reciprocating part, forming a space for the free discharge of material. This is very important, as it prevents the clogging of the carriage in its forward movement and it allows for the free flow of material to the angle of repose. Furthermore, the back plate of the hopper is at such an angle that it will allow for the ready flow of material to the plate, but will take the weight of the material from the carriage, so that the carriage can be freely reciprocated without undue friction.

The carriage is reciprocated by any suitable means, preferably the means shown in Figs. 1 and 2, in which one of the axles $b$ on each side of the carriage is connected to a crank-pin $h$ of a crank E on a shaft $E'$. The cranks E in the present instance are double cranks having a series of holes for the pin $h$, so that more or less movement can be imparted to the carriage B by adjusting the crank-pins in the cranks.

The connecting-rods F F are adapted to boxes $ff$ on the axles $b\ b$ and to boxes $f'\ f'$ on the crank-pins $h$. The rods are preferably screw-threaded, and nuts are mounted on each side of each box, so that the boxes can be adjusted on the rods. The connecting-rods can be coupled to any of the axles, provided they are extended, or in some instances may be coupled to special studs projecting from the carriage.

We have shown in Fig. 1 the device used for discharging material from a hopper into conveyer-buckets. The buckets $i$ of the conveyer I can be of any suitable form, and as the conveyer is moved continuously forward it passes around the sprocket-wheel G' on the shaft G in the present instance, and this shaft may be the driving-shaft of the machine. In order that the carriage will reciprocate in proper time with the movement of the bucket-conveyer, we gear the shaft G to the crank-shaft E' by a gear-wheel $g$ and pinion $h'$. In the drawings the gearing is shown seven to one. The buckets $i$ are so proportioned that a bucket is directly under the discharge-point when the carriage B is moved back, allowing the material to flow from the hopper, but as the conveyer moves forward the carriage moves forward to cut off the flow of material until the mouth of the next bucket nears the discharge-point, when the carriage again recedes, allowing the material to flow. If, for instance, in operating the carriage the plate is set as shown in Figs. 5 and 6, when the carriage is in its forward position, as shown in Fig. 5, the material will be prevented from escaping from the hopper, as the material at the open end of the hopper assumes such an angle as to prevent the discharge of any material from the hopper, but as soon as the carriage is moved back the plate B' is withdrawn, and the material which heretofore rested on the end of the plate will drop away, as shown in Fig. 6, not being supported. When the carriage is moved forward again, the plate agitates the material above it, carrying with it certain lumps, and the additional material will feed down from the hopper, and the feed will continue until it again assumes such an angle as to prevent further discharge of material, as shown in Fig. 5.

We claim as our invention—

1. The combination of a hopper in which material can accumulate, having an opening in the front of said hopper at the bottom thereof, a conveyer under the hopper, a reciprocating plate between the hopper and the conveyer and extending beyond the opening in the front of the hopper, and means for reciprocating the plate so as to cause a predetermined amount of material to be intermittently discharged from the hopper onto the plate and from the end of the plate onto the conveyer at each reciprocation of the plate, substantially as described.

2. The combination of a hopper, having an opening in the front and bottom, a reciprocating plate directly under that portion of the opening at the bottom, and means for intermittently reciprocating the plate, whereby a predetermined amount of material is drawn from the hopper and discharged over the edge of the plate, substantially as described.

3. The combination of a hopper open in front, a conveyer under the hopper, a reciprocating plate between the hopper and the conveyer and extending beyond the open front of the hopper, means for reciprocating the plate so as to cause a predetermined amount of material to be intermittently discharged from the end of the plate, and means for altering the position of the edge of the carriage over which the material flows, substantially as described.

4. The combination of a hopper or chute, a carriage, a plate mounted on the carriage forming the bottom of the hopper or chute, and means for reciprocating the carriage, said plate being adjustable on the carriage, substantially as described.

5. The combination of a hopper or chute, a carriage mounted under the hopper, the body of the carriage being cut away forming a discharge-opening for the hopper or chute, a plate mounted on the carriage and forming the bottom of the hopper or chute, and means for adjusting said plate, substantially as described.

6. The combination of tracks, a carriage mounted on the tracks, a hopper open in front, an inclined back plate and side plates extending to the carriage, the body of the carriage being wider than the mouth of the hopper and cut away at its forward end, and means for reciprocating the carriage so that as the carriage is reciprocated the material will be discharged from the end thereof and material will be fed onto the carriage from the hopper, substantially as described.

7. The combination of a hopper open in front, a continuously-moving conveyer mounted under the hopper, a reciprocating part mounted between the hopper and the conveyer, and means for reciprocating said part in time with the movement of the conveyer, so that material will be drawn from the hopper and discharged from the part as each bucket of the conveyer is presented, substantially as described.

8. The combination of a hopper having an opening partly in the front and partly in the bottom and having at the back an inclined supporting-plate for the material in the hopper, a carriage closing the bottom opening of the hopper leaving the side opening free, and means for reciprocating the carriage so as to intermittently draw material from the hopper and discharge the material from the end of the carriage, substantially as described.

9. An automatic feeding device for conveyers, comprising a receptacle adapted to receive the material to be fed and provided with a discharge-opening, a reciprocating part interposed between said discharge-opening and the conveyer and separated from the discharge-opening by a space, said part adapted to receive the material after it passes through said opening, and means for reciprocating said part at predetermined times so as to feed the material to the conveyer.

10. A feeding device, comprising a receptacle adapted to contain the material to be fed, and having a discharge-opening therein, a substantially horizontal movable piece below said opening in a plane at an angle to the plane of said opening, so that it does not directly control it, said piece adapted to receive the material passing through the discharge-opening and check the flow thereof, and means for moving said piece so as to permit a portion of the material supported thereby to be discharged therefrom.

11. In a feeding device, the combination with a receptacle provided with a discharge-opening, of a movable part placed below the opening in a plane at an angle to the plane of said opening, separated therefrom by a space, said part adapted to receive the material so as to limit the flow through said discharge-opening, and means for moving said part from beneath a portion of the material so as to produce a gradual feed thereof.

12. The combination with a conveyer, of a feeding device comprising a receptacle in which the material is contained, provided with a discharge-opening, a reciprocating part interposed between the receptacle and the conveyer and located entirely out of the path of said conveyer, said part separated from the discharge-opening by a space and adapted to receive the material from the receptacle and check the discharge, and means for moving said movable part so as to permit said material to be gradually fed into the conveyer.

13. The combination with a conveyer provided with a series of buckets adapted to move in a horizontal direction during a portion of their travel, of an automatic feeding device, comprising a receptacle in which the material is received, and having a discharge-opening therein, a reciprocating part interposed between the conveyer and said opening and in a plane at an angle to the plane of the opening, said part adapted to receive the material passing therefrom and check its flow, and means for moving said reciprocating part at predetermined intervals so as to discharge a portion of said material into each bucket.

In testimony whereof we have signed our names to this specification in the presence of two subscribing witnesses.

FERDINAND F. WAECHTER.
FREDERIC V. HETZEL.

Witnesses:
WILL. A. BARR,
JOS. H. KLEIN.